United States Patent
Ariyavisitakul

(10) Patent No.: US 7,680,205 B2
(45) Date of Patent: Mar. 16, 2010

(54) METHOD AND SYSTEM FOR TRANSMITTER BEAMFORMING FOR REDUCED COMPLEXITY MULTIPLE INPUT MULTIPLE OUTPUT (MIMO) TRANSCEIVERS

(75) Inventor: Sirikiat Lek Ariyavisitakul, Alpharetta, GA (US)

(73) Assignee: Broadcom Corporation, Irvine, CA (US)

(*) Notice: Subject to any disclaimer, the term of this patent is extended or adjusted under 35 U.S.C. 154(b) by 811 days.

(21) Appl. No.: 11/494,962

(22) Filed: Jul. 28, 2006

(65) Prior Publication Data
US 2008/0043873 A1   Feb. 21, 2008

(51) Int. Cl.
 H04B 7/02   (2006.01)
 H04L 1/02   (2006.01)
(52) U.S. Cl. .................. 375/267; 375/146; 375/295; 375/299
(58) Field of Classification Search .......... 375/146, 375/219, 267, 295, 299
See application file for complete search history.

(56) References Cited

U.S. PATENT DOCUMENTS

2006/0008022 A1* 1/2006 Wight ............... 375/267
2006/0120478 A1* 6/2006 Kim et al. ........... 375/267
2007/0258536 A1* 11/2007 Kim et al. ........... 375/267

OTHER PUBLICATIONS

Yi Jiang, Lian Li and William W. Hager, "Uniform Channel Decomposition for MIMO Communications," IEEE Transaction on Signal Processing, vol. 53, No. 11, Nov. 2005, pp. 4283 4294.
Andrew J. Viterbi, "Error Bounds for Convolutional Codes and an Asymptotically Optimum Decoding Algorithm," IEEE Transactions on Information Theory, vol. IT-13, No. 2, Apr. 1967, pp. 260-269.

* cited by examiner

*Primary Examiner*—Ted M Wang
(74) *Attorney, Agent, or Firm*—McAndrews, Held & Malloy

(57) ABSTRACT

Aspects of a method and system for transmitter beamforming for reduced complexity multiple input multiple output (MIMO) transceivers are presented. Aspects of the system may include a MIMO transmitter that computes a channel estimate matrix and decomposes the computed channel estimate matrix based on singular value decomposition (SVD). Singular values in a singular value matrix may be rearranged and grouped to generate a plurality of submatrices. In one aspect, each of the submatrices may be decomposed based on GMD at a MIMO transmitter, while a MIMO receiver may utilize a vertical layered space time (VLST) method. In another aspect, the MIMO transmitter may utilize Givens rotation matrices corresponding to each of the submatrices, while the MIMO receiver may utilize maximum likelihood (ML) detection.

22 Claims, 7 Drawing Sheets

METHOD AND SYSTEM FOR TRANSMITTER BEAMFORMING FOR REDUCED COMPLEXITY MULTIPLE INPUT MULTIPLE OUTPUT (MIMO) TRANSCEIVERS

CROSS-REFERENCE TO RELATED APPLICATIONS/INCORPORATION BY REFERENCE

Not Applicable.

FIELD OF THE INVENTION

Certain embodiments of the invention relate to wireless communication. More specifically, certain embodiments of the invention relate to a method and system for beamforming for transmitter beamforming for reduced complexity multiple input multiple output (MIMO) transceivers.

BACKGROUND OF THE INVENTION

In multiple input multiple output (MIMO) wireless systems, multiple data streams may be transmitted simultaneously using a plurality of transmitting antennas. A MIMO receiver may utilize a plurality of receiving antennas to decouple, and detect individual data streams. Two predominant methods for MIMO transmission include singular value decomposition (SVD), and layered space-time (LST) processing, also known as successive interference cancellation (SIC).

SVD may use beamforming in conjunction with a transmitter antenna array and receiver antenna array to create virtual channels, or eigen-channels, through which multiple data streams may be sent without interfering with one another. LST/SIC may use receiver antennal array processing to detect the multiple data streams, one stream at a time. For each detection "layer," the interference from yet undetected streams may be nulled out, while the interference from already detected streams may be cancelled, or subtracted, out.

The eigen-channels in SVD may have highly unequal signal to noise ratios (SNR), depending on the eigen-spread of the MIMO channel matrix. SVD may also rely upon adaptive modulation, or adaptive bit loading, to achieve greater data transfer rates for eigen-channels associated with higher SNR values, while simultaneously supporting lower data transfer rates for eigen-channels associated with lower SNR values. SVD may also suffer performance loss, by not achieving the peak theoretical data transfer rate aggregated among the eigen-channels when a broad range of modulation types are not available. For example, if a maximum data transfer rate associated with an eigen-channel requires a 1024 QAM modulation type, the maximum data transfer rate may not be achievable if the required modulation type is not available to be utilized.

LST/SIC approaches may suffer performance losses as a result of error propagation. For example, if a current layer is detected in error, the error may propagate to other layers increasing the probability that subsequent layers may also be detected in error. LST/SIC may require stream re-ordering to detect data streams with higher SNR values first to minimize error propagation. Some methods, such as vertical LST (VLST) may provide error protection through coding of each data stream. Based on the coding, decisions may be made subsequent to decoding to subtract out interference.

Alternatively, preceding based on dirty paper theory, for example Tomlinson-Harashima precoding (THP), may be utilized to pre-cancel interference at the transmitter without requiring the signals to be transmitted with greater levels of transmitted radiated power. The THP approach may require channel knowledge at the transmitter.

Geometric mean decomposition (GMD) may be based on beamforming and LST/SIC at a transmitter, by utilizing THP for example, or based on LST/SIC at a receiver, by utilizing VLST for example. SNRs for each of a transmitted plurality of data streams may be about equal when utilizing GMD. Consequently, adaptive bit loading may not be required as may be the case with SVD. GMD may also not require reordering of data streams as may be the case with LST/SIC.

While a combination of GMD beamforming at a MIMO transmitter and VLST at a MIMO receiver may be utilized to achieve desirable performance levels within theoretical limitations, the latency and/or complexity associated with implementation of successive interference cancellation (SIC) methods may impose limitations on the design of MIMO receivers. IEEE 802.11 specifications may comprise requirements for structures utilized for coding data transmitted via a wireless communication channel, and for packet detection delay limits that establish a time duration between a time instant when one or more signals are received by a MIMO receiver, and a subsequent time instant when data transmitted via the one or more signals is detected at the MIMO receiver.

Alternatively, a brute-force method, referred to as maximum likelihood (ML) detection may be utilized at a MIMO receiver to jointly detect data transmitted via one or more signals without relying on SIC. The computational complexity of ML detection, however, may grow exponentially with the number of spatial streams and may be represented as $M^{NSS}$, where M may represent a number of levels associated with a modulation type, for example M-QAM, and NSS may represent a number of spatial streams transmitted by a MIMO transmitter. Due to computational complexity, it may be impractical to implement ML detection in some conventional systems for values NSS>2 for 64-QAM may exceed practical limits. Furthermore, the computational task of computing beamforming factors at a MIMO transmitter to be utilized with ML detection at a MIMO receiver may be non-deterministic polynomial-time hard (NP-hard).

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for beamforming for transmitter beamforming for reduced complexity multiple input multiple output (MIMO) transceivers, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention relate to a method and system for transmitter beamforming for reduced complexity multiple input multiple output (MIMO) transceivers. Various embodiments of the invention comprise a method referred to as "subspace beamforming". In various embodiments of the invention, the complexity of the computational task may be reduced by grouping the plurality of spatial streams into spatial stream subsets, and then detecting at least a portion of the data, which may be contained within each corresponding spatial stream subset. In an exemplary embodiment of the invention, the group may comprise no more than 2 spatial streams from the plurality of spatial streams. The data contained in the plurality of spatial streams may be detected by combining each portion of the data detected within each corresponding spatial stream subset. The computational complexity of detecting each portion of data within each corresponding spatial stream subset may be significantly reduced in comparison to some conventional methods, in which the data may be detected by processing the plurality of spatial streams as a single group.

In an exemplary embodiment of the invention, a MIMO receiver may utilize a method referred to as "hybrid nulling," for the detection of each portion of data in a corresponding spatial stream subset in connection with GMD beamforming at a MIMO transmitter. In another exemplary embodiment of the invention, a MIMO receiver may utilize the hybrid nulling method in connection with a maximum likelihood (ML) method applied to a 2×2 matrix.

Figure 1:
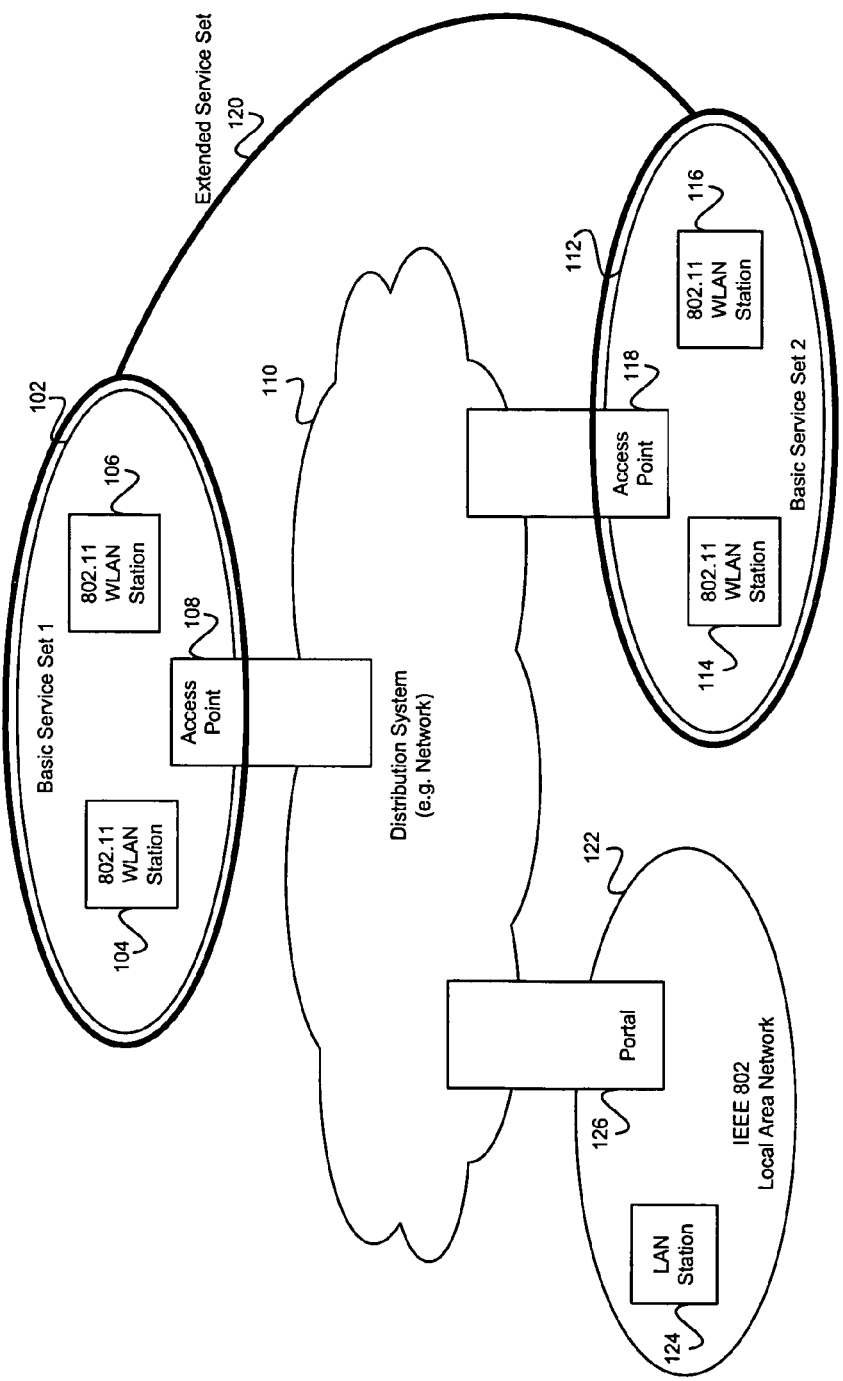
FIG. 1 is a block diagram of an exemplary system for wireless data communications, which may be utilized in connection with an embodiment of the invention.

FIG. 1 is a block diagram of an exemplary system for wireless data communications, which may be utilized in connection with an embodiment of the invention. With reference to FIG. 1, there is shown a distribution system (DS) 110, an extended service set (ESS) 120, and an IEEE 802 LAN 122. The ESS 120 may comprise a first basic service set (BSS) 102, and a second BSS 112. The first BSS 102 may comprise a first 802.11 WLAN station 104, a second 802.11 WLAN station 106, and an access point (AP) 108. The second BSS 112 may comprise a first 802.11 WLAN station 114, a second 802.11 WLAN station 116, and an access point (AP) 118. The IEEE 802 LAN 122 may comprise a LAN station 124, and a portal 126. An IEEE 802.11 WLAN station, or IEEE 802.11 WLAN device, is a WLAN system that may be compliant with at least a portion of the IEEE 802.11 standard.

A WLAN is a communications networking environment that comprises a plurality of WLAN devices that may communicate wirelessly via one or more uplink and/or downlink RF channels. The BSS 102 or 112 may be part of an IEEE 802.11 WLAN that comprises at least 2 IEEE 802.11 WLAN stations, for example, the first 802.11 WLAN station 104, the second 802.11 WLAN station 106, and the AP 108, which may be members of the BSS 102. Non-AP stations within BSS 102, the first 802.11 WLAN station 104, and the second 802.11 WLAN station 106, may individually form an association with the AP 108. An AP, such as AP 108, may be implemented as an Ethernet switch, bridge, or other device in a WLAN, for example. Similarly, non-AP stations within BSS 112, the first 802.11 WLAN station 114, and the second 802.11 WLAN station 116, may individually form an association with the AP 118. Once an association has been formed between a first 802.11 WLAN station 104 and an AP 108, the AP 108 may communicate reachability information about the first 802.11 WLAN station 104 to other APs associated with the ESS 120, such as AP 118, and portals such as the portal 126. The WLAN station 104 may subsequently communicate information wirelessly via the BSS 102. In turn, the AP 118 may communicate reachability information about the first 802.11 WLAN station 104 to stations in BSS 112. The portal 126, which may be implemented as, for example, an Ethernet switch or other device in a LAN, may communicate reachability information about the first 802.11 WLAN station 104 to stations in LAN 122 such as the 802 LAN station 124. The communication of reachability information about the first 802.11 WLAN station 104 may enable WLAN stations that are not in BSS 102, but are associated with ESS 120, to communicate wirelessly with the first 802.11 WLAN station 104.

The DS 110 may provide an infrastructure which enables a first 802.11 WLAN station 104 in one BSS 102, to communicate wirelessly with a first 802.11 WLAN station 114 in another BSS 112. The DS 110 may also enable a first 802.11 WLAN station 104 in one BSS 102 to communicate with an 802 LAN station 124 in an IEEE 802 LAN 122, implemented as, for example a wired LAN. The AP 108, AP 118, or portal 126 may provide a means by which a station in a BSS 102, BSS 112, or LAN 122 may communicate information via the DS 110. The first 802.11 WLAN station 104 in BSS 102 may communicate information wirelessly to a first 802.11 WLAN station 114 in BSS 112 by transmitting the information wirelessly to AP 108, which may transmit the information via the DS 110 to AP 118, which in turn may transmit the information wirelessly to station 114 in BSS 112. The first 802.11 WLAN station 104 may communicate information wirelessly to the 802 LAN station 124 in LAN 122 by transmitting the information wirelessly to AP 108, which may transmit the information via the DS 110 to the portal 126, which in turn may transmit the information to the 802 LAN station 124 in LAN 122. The DS 110 may utilize wireless communications via an RF channel, wired communications, such as IEEE 802.3 or Ethernet, or a combination thereof.

A WLAN station or AP may utilize one or more transmitting antennas, and one or more receiving antennas when communicating information. A WLAN station or AP that utilizes a plurality of transmitting antennas and/or a plurality of receiving antennas may be referred to as a multiple input multiple output (MIMO) system.

Figure 2:
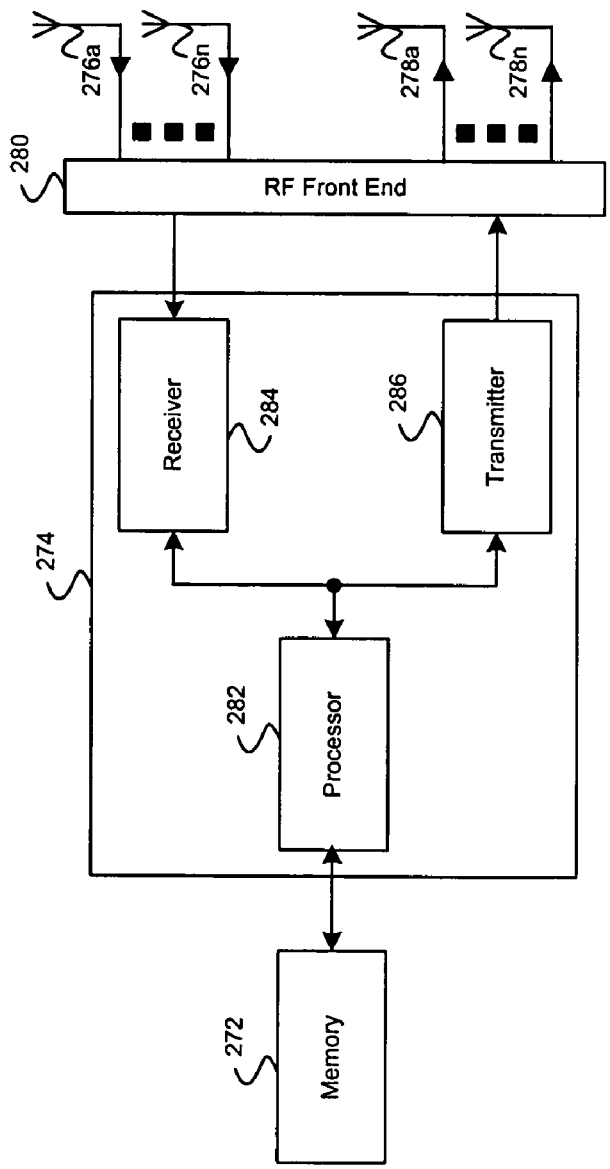
FIG. 2 is a block diagram of an exemplary MIMO system that may be utilized in connection with an embodiment of the invention.

FIG. 2 is a block diagram of an exemplary MIMO system that may be utilized in connection with an embodiment of the invention. With reference to FIG. 2 there is shown a memory 272, a transceiver 274, an RF front end 280, a plurality of receiving antennas 276a, ..., 276n, and a plurality of transmitting antennas 278a, ..., 278n. The transceiver 274 may comprise a processor 282, a receiver 284, and a transmitter 286.

The processor 282 may perform digital receiver and/or transmitter functions in accordance with applicable communications standards. These functions may comprise, but are not limited to, tasks performed at lower layers in a relevant protocol reference model. These tasks may further comprise the physical layer convergence procedure (PLCP), physical medium dependent (PMD) functions, and associated layer management functions. These functions may comprise, but are not limited to, tasks related to analysis of data received via the receiver 284, and tasks related to generating data to be transmitted via the transmitter 286. These tasks may further comprise medium access control (MAC) layer functions as specified by pertinent standards. The memory 272 may be utilized to store data and/or code, and/or utilized to retrieve data and/or code. The memory 272 may receive data and/or code via input signals along with input control signals that enable the memory 272 to store the received data and/or code. The memory 272 may receive input control signals the enable the memory 272 to output data and/or code that was previously stored. The memory 272 may receive input control signals that enable the memory 272 to delete data and/or code that was previously stored.

The receiver 284 may perform digital receiver functions that may comprise, but are not limited to, fast Fourier transform processing, beamforming processing, equalization, demapping, demodulation control, deinterleaving, depuncture, and decoding. The transmitter 286 may perform digital transmitter functions that comprise, but are not limited to, coding, puncture, interleaving, mapping, modulation control, inverse fast Fourier transform processing, beamforming processing. The RF front end 280 may receive analog RF signals via antennas 276a, ..., 276n, converting the RF signal to baseband and generating a digital equivalent of the received analog baseband signal. The digital representation may be a complex quantity comprising I and Q components. The RF front end 280 may also transmit analog RF signals via an antenna 278a, ..., 278n, converting a digital baseband signal to an analog RF signal.

In operation, the processor 282 may receive data from the receiver 284. The processor 282 may perform analysis and further processing on the received data. For example, the processor 282 may perform baseband processing on the received data, in which a portion of the received data is analyzed. Based on this analysis, the processor may generate signals to control the operation of the receiver 284 for receiving the remaining portion of the data, for example. The processor 282 may generate a plurality of bits that are communicated to the transmitter 286. The processor 282 may generate signals to control the operation of the modulation process in the transmitter 286, and of the demodulation process in the receiver 284. The processor 282 may compute weights that may be utilized for beamforming at the transmitter 286, and/or that may be utilized for detection of received data at the receiver 284.

In various embodiments of the invention, the processor 282 may store and/or retrieve data stored in the memory 272 related to subspace beamforming and/or ML detection. In connection with a MIMO transmitter, the processor 282 may compute factors for subspace beamforming data when transmitting a plurality of spatial streams. In connection with a MIMO receiver, the processor 282 may perform hybrid nulling and subsequent SIC, or ML detection when detecting received data by utilizing a plurality of submatrices. Each of the plurality of submatrices may be a constituent submatrix derived from a matrix. Each of the plurality of submatrices may comprise a distinct subset of the matrix elements contained within the matrix. The matrix may be utilized for detecting the received data. The plurality of submatrices may be utilized for detecting the received data wherein each of the plurality of submatrices may be utilized for detecting a portion of the received data. The computational complexity associated with detecting the received data when utilizing the plurality of submatrices may be less than the computation complexity associated with detecting the received data when utilizing the matrix.

Figure 3:
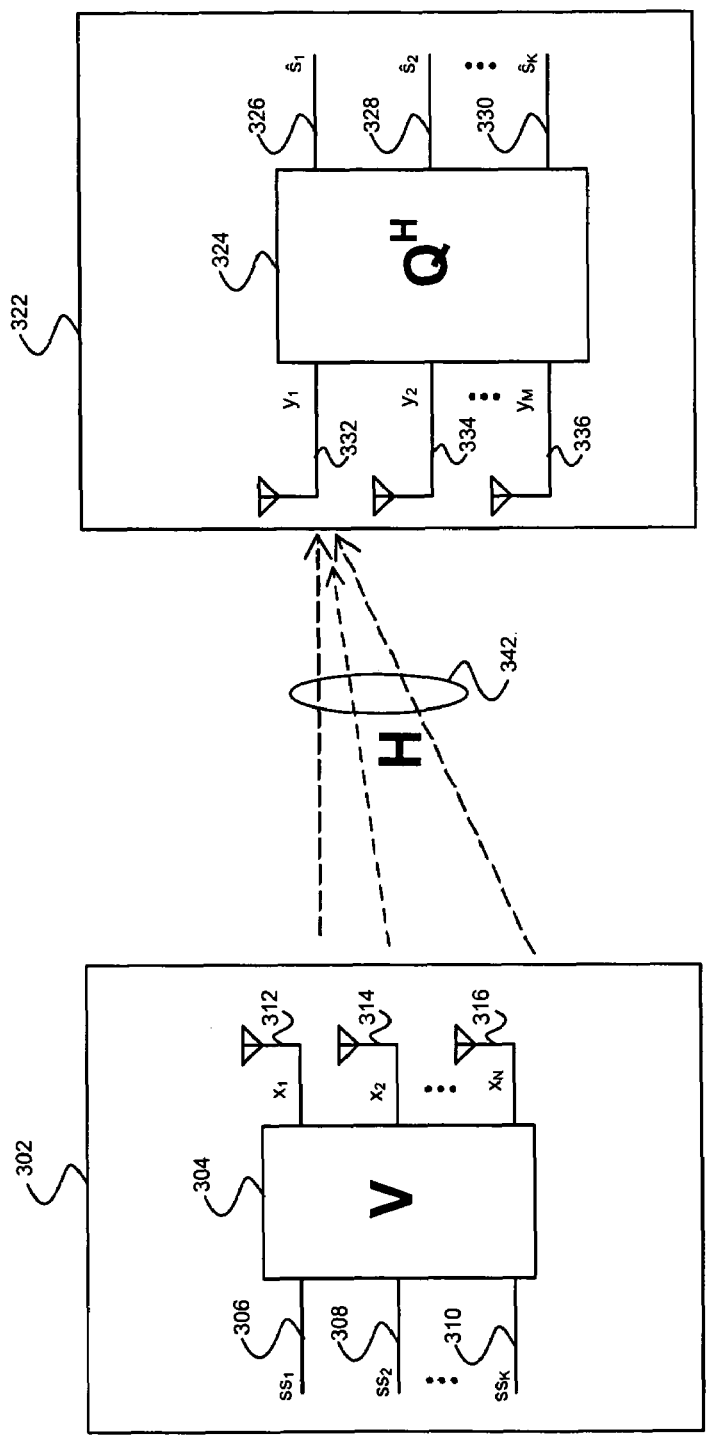
FIG. 3 is an exemplary diagram illustrating beamforming that may be utilized in connection with an embodiment of the invention.

FIG. 3 is an exemplary diagram illustrating beamforming that may be utilized in connection with an embodiment of the invention. Referring to FIG. 3 there is shown a transmitting mobile terminal 302, a receiving mobile terminal 322, and a plurality of RF channels 342. The transmitting mobile terminal 302 comprises a transmit filter coefficient block V 304, and a plurality of spatial streams $ss_1$ 306, $ss_2$ 308, and $ss_K$ 310, where K may represent a number of spatial streams transmitted by the transmitting mobile terminal 302. The transmitting mobile terminal may further comprise a plurality of transmitting antennas 312, 314, and 316. The number of transmitting antennas may be represented by the variable N. The receiving mobile terminal 322 comprises a receive filter coefficient block $Q^H$ 324, a plurality of destination streams $\hat{s}_1$ 326, $\hat{s}_2$ 328, and $\hat{s}_K$ 330, and a plurality of receiving antennas 332, 334, and 336. The number of receiving antennas may be represented by the variable M. An exemplary mobile terminal may be a WLAN station 104, for example.

In operation, the transmitting antenna 312 may enable transmission of a signal $x_1$, the transmitting antenna 314 may enable transmission of a signal $x_2$, and the transmitting antenna 316 may enable transmission of a signal $x_N$. In a beamforming operation at the transmitter 302, each of the transmitted signals $x_1, x_2, \ldots, x_N$ may be a function of a weighted summation of at least one of the plurality of the spatial streams $ss_1, ss_2, \ldots, ss_K$. The weights may be determined by a beamforming matrix V in connection with the transmit coefficient filter block 304.

The receiving antenna 332 may receive a signal $y_1$, the receiving antenna 334 may receive a signal $y_2$, and the receiving antenna 336 may receive a signal $y_M$. The plurality of RF channels 342 may be characterized mathematically by a transfer coefficient matrix H. The transfer coefficient matrix H may also be referred to as a channel estimate matrix.

Each of the plurality of concurrently received signals $y_1, y_2, \ldots, y_M$, may be computed based on the plurality of transmitted signals $x_1, x_2, \ldots, x_N$, and the transfer coefficient matrix H, and a noise vector $N_c$. The vector $N_c$ may comprise a vector representation of noise that may exist in the communications medium, for example. The relationship between the plurality of concurrently received signals, the plurality of transmitted signals, the channel estimate matrix, and the noise vector may be as represented in the following equation:

$$Y = H \cdot X + N_c \quad \text{equation[1a]}$$

where Y may represent the plurality of concurrently received signals, which may be represented as illustrated in the following equation:

$$Y = \begin{bmatrix} y_1 \\ y_2 \\ \vdots \\ y_M \end{bmatrix} \quad \text{equation [1b]}$$

X may represent the plurality of transmitted signals, which may be represented as illustrated in the following equation:

$$X = \begin{bmatrix} x_1 \\ x_2 \\ \vdots \\ x_N \end{bmatrix} \quad \text{equation [1c]}$$

N may represent the noise vector, which may be represented as illustrated in the following equation:

$$N_C = \begin{bmatrix} n_1 \\ n_2 \\ \vdots \\ n_N \end{bmatrix} \quad \text{equation [1d]}$$

and H may represent the channel estimate matrix, which may be represented as illustrated in the following equation:

$$H = \begin{bmatrix} h_{11} & h_{12} & \ldots & h_{1N} \\ h_{21} & h_{22} & \ldots & h_{2N} \\ \vdots & \vdots & \vdots & \vdots \\ h_{M1} & h_{M2} & \ldots & h_{MN} \end{bmatrix} \quad \text{equation [1e]}$$

where matrix elements contained in the channel estimate matrix H may be computed at a MIMO receiver 322 based on at least a portion of data received via a communications medium. For example, the matrix elements may be computed based on preamble data contained in a message transmitted via the communications medium and received at the MIMO receiver 322.

In a nulling operation at the MIMO receiver 322, each of the destination streams, $\hat{s}_1$ 326, $\hat{s}_2$ 328, and $\hat{s}_K$ 330, may be computed as a function of a weighted summation of at least one of the plurality of currently received signals $y_1, y_2, \ldots, y_M$. The weights may be determined by a nulling matrix $Q^H$ in connection with the receive coefficient filter block 324. The destination stream, $\hat{s}_1$ 326, may comprise estimated values for data contained in the corresponding spatial stream $ss_1$ 306. The destination stream, $\hat{s}_2$ 328, may comprise estimated values for data contained in the corresponding spatial stream $ss_2$ 308. The destination stream, $\hat{s}_K$ 330, may comprise estimated values for data contained in the corresponding spatial stream $ss_K$ 310.

In a system utilizing singular value decomposition (SVD), the channel estimate matrix H may be represented by a decomposition, as illustrated in the following equation:

$$H = USV_1^H \quad \text{equation[2]}$$

where U may represent a matrix, $V_1$ may represent a matrix, $V_1^H$ may represent an Hermitian transpose for the matrix $V_1$. The matrix S may represent a diagonal matrix. For a matrix H comprising M rows and N columns (M×N), the matrix U may comprise M rows and M columns (M×M), the matrix S may comprise M rows and N columns (M×N), and the matrix $V_1^H$ may comprise N rows and N columns (N×N), for example.

In the matrix S, the value of each matrix element located in an $i^{th}$ row and $j^{th}$ column may be equal to 0 when the value of the index i is not equal to the value of the index j, where the value of i may be less than or equal to the number of rows in the matrix S, and the value of j may be less than or equal to the number of columns in the matrix S. In the matrix S, diagonal matrix elements may be located in an $i^{th}$ row and $i^{th}$ column, where the value of i may be less than or equal to the lesser of the number of rows in the matrix S, and the number of columns in the matrix S. At least a portion of the diagonal matrix elements in the matrix S may comprise values that are non-zero. Each of the singular values $\lambda_{ii}$ may be represented by a real number.

Each of the diagonal matrix elements in the matrix S may represent a singular value $\lambda_{ii}$, where ii may represent indexes to an $i^{th}$ row and $i^{th}$ column. The singular values may be arranged within the matrix S such that $\lambda_{ii} \geq \lambda_{jj}$, where jj may represent indexes to an $j^{th}$ row and $j^{th}$ column, for values of j>i. The singular values $\lambda_{ii}$ may be square roots of eigenvalues computed from the matrix multiplication product $H \cdot H^H$ or from the matrix multiplication product $H^H \cdot H$. The columns of the matrix U may comprise eigenvectors computed from the matrix multiplication product $H \cdot H^H$. The columns of the matrix $V_1$ may comprise eigenvectors computed from the matrix multiplication product $H^H \cdot H$. The M×M matrix U may be a unitary matrix for which the matrix multiplication product $U^H \cdot U$ is equal to an N×N identity matrix I. The N×N matrix $V_1$ may be a unitary matrix for which the matrix multiplication product $V_1^H \cdot V_1$ may be equal to an N×N identity matrix I.

For values M=4 and N=4, an exemplary 4×4 matrix S may be represented as illustrated in the following equation:

$$S = \begin{bmatrix} \lambda_{11} & 0 & 0 & 0 \\ 0 & \lambda_{22} & 0 & 0 \\ 0 & 0 & \lambda_{33} & 0 \\ 0 & 0 & 0 & \lambda_{44} \end{bmatrix} \quad \text{equation [3]}$$

In a system utilizing geometric mean decomposition (GMD), the matrix S may be represented by a decomposition, as illustrated in the following equation:

$$S = QLP^H \quad \text{equation[4]}$$

where Q may represent a matrix, P may represent a matrix, $P^H$ may represent an Hermitian transpose for the matrix P. The matrix L may represent a lower triangular matrix.

For a matrix H comprising M rows and N columns (M×N), the matrix Q may comprise M rows and K columns (M×K), the matrix L may comprise K rows and K columns (K×K), and the matrix $P^H$ may comprise K rows and N columns (K×N), for example. The value for K may represent the number of singular values in the matrix S. The matrix L may represent an upper triangular matrix, or a lower triangular matrix in various embodiments of the invention. The matrix elements associated with the matrix L may each be represented by a real number. The diagonal matrix elements in the matrix L may be about equal in value. The value for each of the diagonal matrix elements $l_{ii}$ in the matrix L may be about equal to the geometric mean value, $\bar{\lambda}_H$, of the singular values, $\lambda_{nn}$, of the matrix S, and may be represented as illustrated in the following equation, for example:

$$l_{ii} = \bar{\lambda}_H \sqrt[K]{\prod_{n=1}^{K} \lambda_{nn}} \quad \text{equation [5]}$$

where the geometric mean value may be represented as being equal to the $K^{th}$ root of the multiplicative product of the K singular values $\lambda_{nn}$, where n may represent a value less than or equal to the value K. The M×K matrix Q may be a unitary matrix. The K×N matrix $P^H$ may be a unitary matrix.

The matrix L may be computed by pre-multiplying a singular matrix S, as in equation[3], by a plurality of K−1 pre-multiplication matrices, $Q_j^H$, and by a corresponding plurality of K−1 post-multiplication matrices, $P_j$. Each of the plurality of pre-multiplication matrices, $Q_j^H$, may be represented by a matrix multiplication product $G_j^H \cdot \Pi$, where $G_j^H$ may represent an Hermitian transpose of a Givens rotation matrix $G_j$, Π may represent a permutation matrix, and j may represent an index for a $j^{th}$ pre-multiplication matrix, the value of which may be less than the number of singular values in the matrix S. Each of the plurality of post-multiplication matrices, $P_j$, may be represented by a matrix multiplication product $\Pi \cdot G_j'$, where $G_j'$ may represent a Givens rotation matrix, Π may represent the permutation matrix, and j may represent an index for a $j^{th}$ post-multiplication matrix.

The permutation matrix may be utilized in a matrix multiplication operation with a matrix to produce a product matrix in which matrix elements in the product matrix represent a rearrangement of matrix elements in the matrix. Each of the Givens rotation matrices $G_j^H$ and/or $G_j'$ may be utilized in a matrix multiplication operation with a matrix to produce a product matrix, which comprises modified values based on the matrix. For a $j^{th}$ column in the product matrix the value of matrix elements in rows k>j may be about equal to 0, where k may represent an index to a row in the $j^{th}$ column of the product matrix. In this case, the product matrix may be an upper triangular matrix. Alternatively, for a $j^{th}$ column in the product matrix the value of matrix elements in rows k<j may be about equal to 0. In this case, the product matrix may be a lower triangular matrix.

The matrix L may be represented as illustrated in the following equation:

$$L = \left(\prod_{i=1}^{K-1} Q_i^H\right) \cdot S \cdot \left(\prod_{i=1}^{K-1} P_i\right) \qquad \text{equation [6]}$$

Based on equations [2], [4] and [6], a GMD representation of the channel estimate matrix H may be represented as illustrated in the following equation:

$$H = U \cdot \left(\prod_{i=1}^{K-1} Q_i\right) \cdot L \cdot \left(\prod_{i=1}^{K-1} P_i^H\right) \cdot V_1^H \qquad \text{equation [7a]}$$

where:

$$Q = \prod_{i=1}^{K-1} Q_i \qquad \text{equation [7b]}$$

and:

$$P^H = \prod_{i=1}^{K-1} P_i^H \qquad \text{equation [7c]}$$

In various embodiments of the invention, a computed channel estimate matrix H may be decomposed into a plurality of constituent matrices, as in equation[2]. One of the constituent matrices may be a matrix S, which may be a diagonal matrix. An exemplary diagonal matrix S may be as represented in equation[3]. Diagonal matrix elements the M×N diagonal matrix S comprising singular values may be rearranged to generate a rearranged matrix. The diagonal matrix S may be specified based on equation[2]. Each of the nonzero valued diagonal matrix elements may comprise a singular value. Nonzero valued matrix elements from the rearranged matrix may be grouped to generate a plurality of submatrices. Each of the submatrices may comprise P rows and Q columns where the value P may be less than or equal to the value M, and the value Q may be less than or equal to the value N. Each of the plurality of submatrices may comprise a unique set of nonzero valued matrix elements from the diagonal matrix S. Each of the submatrices may be a diagonal matrix. Collectively, the plurality of submatrices may comprise the set of singular values from the diagonal matrix S. The number of submatrices generated based on the diagonal matrix S may be determined as illustrated in the following equation:

$$N_{Sub} \geq \left\lceil \frac{K}{\max(K_{Sub})} \right\rceil \qquad \text{equation [8]}$$

where $N_{sub}$ may represent the number of submatrices, K may represent the number of singular values in the diagonal matrix S, $\max(K_{sub})$ may represent the maximum number of singular values from the diagonal matrix S, which may be contained in any single submatrix. Consequently, any one of the plurality of at least $N_{sub}$ submatrices may comprise singular values from the diagonal matrix S that may range in number from 1 to $\max(K_{sub})$. The value of the operand $\lceil x \rceil$ may be equal to the value of the integer portion of x, int(x), when x is an integer and the fractional portion of x, fract(x), is equal to 0. The value of the operand $\lceil x \rceil$ may be equal to the value of int(x)+1, when the fractional portion of x, fract(x), is not equal to 0.

However, the invention may not be limited to embodiments wherein each of the plurality of submatrices comprises a unique set of nonzero matrix elements from the diagonal matrix S. In various embodiments of the invention, a given singular value may be contained in one or more of the plurality of submatrices. Similarly, various embodiments of the invention may not be limited to being practiced with constituent matrices, which are diagonal matrices. For example, one or more constituent matrices may be block diagonal in structure. Furthermore, various embodiments of the invention may not be limited to being practiced wherein each of the plurality of submatrices is a diagonal matrix. One or more of the plurality of submatrices may not be a diagonal matrix, for example a block diagonal matrix.

In an exemplary embodiment of the invention, each of the submatrices may comprise no more than 2 rows, and no more than 2 columns. A 2×2 submatrix may comprise 2 singular values from the diagonal matrix S. When the number of singular values in the diagonal matrix S is an odd number, one of the submatrices may be a 1×1 matrix, which comprises a single matrix element.

For an $m^{th}$ submatrix, the submatrix may comprise at least an $m^{th}$ largest valued singular value from the diagonal matrix S. For a submatrix that comprises at least 2 rows and/or at least 2 columns, the $m^{th}$ submatrix may also comprise an $m^{th}$ smallest valued singular value from the diagonal matrix S.

For each of the submatrices, a multiplicative product may be computed based on a multiplication of the values of each of the singular values contained in the submatrix. An $m^{th}$ multiplicative product computed from an $m^{th}$ submatrix may be about equal to an $n^{th}$ multiplicative product computed from an $n^{th}$ submatrix.

For an exemplary 4×4 diagonal matrix S, as illustrated in equation[3], the rearranged matrix may be represented as in the following equation:

$$S_{Rearranged} = \begin{bmatrix} \lambda_{11} & 0 & 0 & 0 \\ 0 & \lambda_{44} & 0 & 0 \\ 0 & 0 & \lambda_{22} & 0 \\ 0 & 0 & 0 & \lambda_{33} \end{bmatrix} \quad \text{equation [9]}$$

The singular values from the rearranged matrix $S_{Rearranged}$ may be grouped to generate a plurality of submatrices $S_1$ and $S_2$, as illustrated in the following equation:

$$S_{Rearranged} = \begin{bmatrix} S_1 & 0_2 \\ 0_2 & S_2 \end{bmatrix} \quad \text{equation [10a]}$$

where:

$$0_2 = \begin{bmatrix} 0 & 0 \\ 0 & 0 \end{bmatrix} \quad \text{equation [10b]}$$

and:

$$S_1 = \begin{bmatrix} \lambda_{11} & 0 \\ 0 & \lambda_{44} \end{bmatrix} \quad \text{equation [10c]}$$

and:

$$S_2 = \begin{bmatrix} \lambda_{22} & 0 \\ 0 & \lambda_{33} \end{bmatrix} \quad \text{equation [10d]}$$

In various embodiments of the invention, each of the plurality of submatrices may be decomposed into a corresponding plurality of constituent matrices, as in equation[4]. One of the corresponding plurality of constituent matrices may be a lower triangular matrix, or an upper triangular matrix. An exemplary K×K lower triangular matrix L may be represented as illustrated in the following equation:

$$L = \begin{bmatrix} 1_{11} & 0 & \cdots & & 0 \\ 1_{21} & 1_{22} & 0 & \cdots & 0 \\ \vdots & & \ddots & \ddots & \vdots \\ 1_{K1} & 1_{K2} & \cdots & & 1_{KK} \end{bmatrix} \quad \text{equation [11]}$$

where each $I_{ij}$ may represent a matrix element within the matrix L. Based on equations [4] and [10a], the rearranged matrix may be represented as illustrated in the following equation:

$$S_{Rearranged} = \begin{bmatrix} S_1 & 0_2 \\ 0_2 & S_2 \end{bmatrix} \quad \text{equation [12a]}$$

$$= \begin{bmatrix} Q_1 \cdot L_1 \cdot P_1^H & 0_2 \\ 0_2 & Q_2 \cdot L_2 \cdot P_2^H \end{bmatrix}$$

where the matrices $Q_1$ and $Q_2$ may each correspond to the matrix Q from equation[4], the matrices $L_1$ and $L_2$ may each correspond to the matrix L, and the matrices $P_1^H$ and $P_2^H$ may each correspond to the matrix $P^H$, and:

$$S_{Rearranged} = \begin{bmatrix} Q_1 & 0_2 \\ 0_2 & Q_2 \end{bmatrix} \cdot \begin{bmatrix} L_1 & 0_2 \\ 0_2 & L_2 \end{bmatrix} \cdot \begin{bmatrix} P_1^H & 0_2 \\ 0_2 & P_2^H \end{bmatrix} \quad \text{equation [12b]}$$

and:

$$L_1 = \begin{bmatrix} 1_{11}^1 & 0 \\ 1_{21}^1 & 1_{22}^1 \end{bmatrix} \quad \text{equation [12c]}$$

and:

$$L_2 = \begin{bmatrix} 1_{11}^2 & 0 \\ 1_{21}^2 & 1_{22}^2 \end{bmatrix} \quad \text{equation [12d]}$$

and:

$$P^H = \begin{bmatrix} P_1^H & 0 \\ 0 & P_2^H \end{bmatrix} \quad \text{equation [12e]}$$

The diagonal matrix elements within the matrix $L_1$, $I_{11}^1$ and $I_{22}^1$, may be about equal. The diagonal matrix elements within the matrix $L_2$, $I_{11}^2$ and $I_{22}^2$, may be about equal. In various embodiments of the invention, the diagonal matrix elements $I_{11}^1$, $I_{22}^1$, $I_{11}^2$ and $I_{22}^2$ may be about equal. This method may be referred to as "subspace beamforming". Within in the context of GMD, it may also be referred to as subspace GMD beamforming.

In some conventional systems, the equations [1a], [2], and [4] may be utilized to detect estimated values for data contained in a plurality of spatial streams, $ss_1$, $ss_2$, and $ss_{NSS}$, at a MIMO receiver 322 (FIG. 3). NSS may represent a number of spatial streams transmitted by a MIMO transmitter 302. The estimated values for the data may be determined by computing values for the destination streams, $\hat{s}_1$, $\hat{s}_2$, and $\hat{s}_{NSS}$, at the MIMO receiver 322.

The computational complexity of the task of detecting estimated values for the data may increase as the value of NSS increases. For example, in an exemplary MIMO system comprising a MIMO transmitter 302 with 4 transmitting antennas, which transmits 4 spatial streams, and a MIMO receiver 322 with 4 receiving antennas, M=4, N=4, and NSS=4. The number of singular values contained in the diagonal matrix S may be equal to 4, as in the exemplary 4×4 matrix S as in equation [3]. The lower diagonal matrix L, as in equation[11] may be a 4×4 matrix. The channel estimate matrix H, as illustrated in equation[1e], may be a 4×4 matrix.

In addition, latency associated with detecting estimated values for the data may also increase as NSS increases. For example, when performing successive interference cancellation (SIC) in connection with equation[4], estimated values for data contained in destination stream $\hat{s}_1$ may be detected first. The data contained in a destination stream may be detected from a symbol. The symbol may be contained in the destination stream. Based on the detection of data contained in the destination stream $\hat{s}_1$, estimated values for data contained in a symbol contained in destination stream $\hat{s}_2$ may be detected second. Based on the detection of data contained in the destination streams $\hat{s}_1, \hat{s}_2, \hat{s}_{NSS-1}$, estimated values for data contained in a symbol contained in destination stream $\hat{s}_{NSS}$ may be subsequently detected.

The latency may be further increased when, in the above example, a symbol detected by a MIMO receiver 322 from the destination stream $\hat{s}_1$ is not transmitted first in order among the plurality of symbols transmitted in spatial streams $ss_1$, $ss_2, \ldots, ss_{NSS}$ by MIMO transmitter 302. The MIMO receiver 322 may store, or buffer, the previously received symbols while suspending detection of data until the symbol contained in the destination stream $\hat{s}_1$ is received. In connection with ML detection, computational complexity of the task detecting estimated values for the data may increase exponentially with increasing values of NSS.

In various embodiments of the invention, the computational complexity associated with computing estimated values for the data may be reduced by subdividing the matrix S into a plurality of submatrices. For example, in the exemplary MIMO system, the 4×4 matrix S may be subdivided into submatrices $S_1$ and $S_2$. Each submatrix may be a 2×2 matrix. The submatrix $S_1$ may be as in equation[10c] and comprise 2 singular values, $\lambda_{11}$ and $\lambda_{44}$, from the matrix S. The submatrix $S_2$ may be as illustrated in equation[10d] and comprise 2 singular values, $\lambda_{22}$ and $\lambda_{33}$, from the matrix S. Each submatrix may be decomposed as illustrated in equation[12a]. The lower diagonal matrix $L_1$ may be a 2×2 matrix. The lower diagonal matrix $L_2$ may be a 2×2 matrix.

In the exemplary MIMO system, the computational task associated with computing estimated values for the data may comprise matrix computations that utilize 2×2 matrices instead of larger 4×4 matrices. Thus, the task may comprise computed estimated values for the data for two subsystems, wherein NSS=2 for each subsystem.

In various embodiments of the invention, the ability to subdivide the matrix S into a plurality of submatrices may result in simplified structures for decoding and/or detecting received data. A trellis diagram may be an exemplary representation of a structure utilized for decoding and/or detecting received data. In some conventional systems utilizing larger 4×4 matrices for example, limitations in memory capacity in the MIMO receiver may impose limitations on traceback length for decoding and/or detecting received data. This may result in higher bit error rates (BER) and/or packet error rates (PER) at the MIMO receiver than may be the case when longer traceback lengths are utilized. In various embodiments of the invention in which the matrix S is subdivided into smaller 2×2 matrices, for example, the MIMO receiver may utilize longer traceback lengths for a given memory capacity when compared to some conventional systems. Consequently, BERs and/or PERs for a MIMO receiver may be lower in various embodiments of the invention when compared to some comparable conventional systems under comparable channel conditions.

The ability to utilize smaller matrices in various embodiments of the invention, when compared to some conventional systems, may also result in reduced latency when detecting estimated values for the data. For example, when performing SIC, the lower diagonal matrix $L_1$ may be utilized wherein estimated data contained in a symbol contained in the destination stream $\hat{s}_1$ may be detected first. Based on the detection of data contained in the destination stream $\hat{s}_1$, estimated values for data contained in a symbol contained in destination stream $\hat{s}_4$ may be detected second. At this point, detection of data based on the lower diagonal matrix $L_1$ may be completed after a single cancellation step. The lower diagonal matrix $L_2$ may be utilized wherein estimated data contained in a symbol contained in the destination stream $\hat{s}_2$ may be detected first. Based on the detection of data contained in the destination stream $\hat{s}_2$, estimated values for data contained in a symbol contained in destination stream $\hat{s}_3$ may be detected second. At this point, detection of data based on the lower diagonal matrix $L_2$ may be completed after a single cancellation step. When a symbol contained in the destination stream $\hat{s}_1$ is received, the lower diagonal matrix $L_1$ may be utilized to detect an estimated value for a symbol contained in the destination stream $\hat{s}_4$. Similarly, when a symbol contained in the destination stream $\hat{s}_2$ is received, the lower diagonal matrix $L_2$ may be utilized to detect an estimated value for a symbol contained in the destination stream $\hat{s}_3$. This method may be referred to as "hybrid nulling" with subsequent SIC.

Latency may be further reduced in various embodiments of the invention by utilizing a permutation matrix $\pi$. The permutation matrix $\pi$ may be utilized to enable a MIMO transmitter 302 to transmit an ordered plurality of spatial streams $ss_{i1}$, $ss_{i2}$, and $ss_{iNSS}$. Based on a vector D, representing the plurality of transmitted spatial streams, an ordered plurality of transmitted spatial streams $D_O$, may be represented as illustrated in the following equation:

$$D_O = \pi \cdot D = \begin{bmatrix} ss_{i1} \\ ss_{i2} \\ \vdots \\ ss_{iNSS} \end{bmatrix} \quad \text{equation [13]}$$

where the vector D may represent an order in which a plurality of spatial streams $ss_1, ss_2, \ldots, ss_{NSS}$, may be transmitted by the MIMO transmitter 302 prior to reordering by the permutation matrix $\pi$. For example, when the vector D may be represented as illustrated in the following equation:

$$D = \begin{bmatrix} ss_1 \\ ss_2 \\ \vdots \\ ss_{NSS} \end{bmatrix} \quad \text{equation [14a]}$$

the permutation matrix $\pi$ may be represented as illustrated in the following equation:

$$\pi = \begin{bmatrix} 1 & 0 & & \ldots & 0 \\ 0 & 1 & 0 & \ldots & 0 \\ & & \ddots & & \\ 0 & & \ldots & 0 & 1 \end{bmatrix} \quad \text{equation [14b]}$$

When the vector D may be represented as illustrated in the following equation:

$$D = \begin{bmatrix} ss_{NSS} \\ ss_{NSS-1} \\ \vdots \\ ss_1 \end{bmatrix} \quad \text{equation [15a]}$$

the permutation matrix $\pi$ may be represented as illustrated in the following equation:

$$\pi = \begin{bmatrix} 0 & \cdots & 0 & 1 \\ 0 & \cdots & 1 & 0 \\ & \cdot^{\cdot^{\cdot}} & & \\ 1 & 0 & \cdots & 0 \end{bmatrix} \quad \text{equation [15b]}$$

In various embodiments of the invention, the permutation matrix $\pi$ may enable the order in which symbols are transmitted in an ordered plurality of spatial streams, as in equation[13], to remain the same even if the order in which symbols are transmitted prior to reordering may vary, as in equations [14a] and [15a], for example. Consequently, the MIMO receiver 322 may receive a symbol contained in a destination stream $\hat{s}_{i1}$, prior to receiving a symbol contained in a destination stream $\hat{s}_{i4}$. Similarly, the MIMO receiver 322 may receive a symbol contained in a destination stream $\hat{s}_{i2}$, prior to receiving a symbol contained in a destination stream $\hat{s}_{i3}$.

The MIMO receiver 322 may utilize the permutation matrix $\pi$ to establish a correspondence between the ordered plurality of destination streams, and the plurality of destination streams. A vector $\hat{S}_O$ may represent the ordered plurality of destination streams $\hat{s}_{i1}, \hat{s}_{i2}, \ldots, \hat{s}_{iNSS}$. Based on the vector $\hat{S}_O$, a vector, $\hat{S}$, representing the plurality of destination streams may be represented as in the following equation:

$$\hat{S} = \pi \cdot \hat{S}_O \quad \text{equation[16a]}$$

where:

$$\hat{S}_O = \begin{bmatrix} \hat{s}_{i1} \\ \hat{s}_{i2} \\ \vdots \\ \hat{s}_{iNSS} \end{bmatrix} \quad \text{equation [16b]}$$

and the vector $\hat{S}$ may comprise a vector representation of the plurality of destination streams $\hat{s}_1, \hat{s}_2, \ldots, \hat{s}_{NSS}$. For example, when the permutation matrix $\pi$ is a matrix as illustrated in equation[14b], the matrix $\hat{S}$ may be represented as illustrated in the following equation:

$$\hat{S} = \begin{bmatrix} \hat{s}_1 \\ \hat{s}_2 \\ \vdots \\ \hat{s}_{NSS} \end{bmatrix} \quad \text{equation [16c]}$$

In various embodiments of the invention, bits may be coded across spatial streams. Coding of bits across spatial streams may enable bits to be transmitted redundantly among a plurality of spatial streams. The bits may be redundantly transmitted based on the grouping of singular values from the diagonal matrix S. For example, in the exemplary 4×4 MIMO system, bits transmitted via spatial stream $ss_1$ may be redundantly transmitted via spatial stream $ss_4$. In addition, bits transmitted via spatial stream $ss_4$ may be redundantly transmitted via spatial stream $ss_1$. Similarly, bits transmitted via spatial stream $ss_2$ may be redundantly transmitted via spatial stream $ss_3$, and bits transmitted via spatial stream $ss_3$ may be redundantly transmitted via spatial stream $ss_2$.

In a MIMO receiver 322, which utilizes hybrid nulling with maximum likelihood (ML) detection, each of the submatrices, $S_i$, associated with a rearranged matrix, $S_{Rearranged}$, may be multiplied by a corresponding Givens rotation matrix $P_i$. In an ML detection method, an estimated value for a received symbol may be compared to each constellation point in a constellation map for a modulation type associated with the corresponding destination stream. Each of the constellation points may represent a candidate value for the estimated value for the received symbol. For each comparison a mean squared error value may be computed. Each mean squared error may represent a computed distance, for example a Euclidean distance. The selected estimated value for the received symbol may be the constellation point with the minimum mean squared error among the plurality of computed mean squared errors. The selected estimated value may be associated with the constellation point with the minimum computed distance.

The MIMO transmitter 302 may signals $V_1*P*X$, where the matrix $V_1$ is as illustrated in equation[2], the matrix P is as illustrated in equation[4], and the vector X is as illustrated in equation[1c]. The MIMO receiver 322 may receive a signal $H*V_1*P*X=U*S*V_1^H*V_1*P*X=U*S*P*X$, where noise may be ignored, the matrix H is as illustrated in equation[1e], and the matrices U and S are as illustrated in equation[2]. The MIMO receiver 322 may subsequently perform the matrix computation $U^H*U*S*P*X=S*P*X$.

The Givens rotation angle $\theta_i$ for each Givens rotation matrix $P_i$ may be selected, for each spatial stream associated with each submatrix $S_i$, to maximize the minimum Euclidean distances for destination streams associated with each submatrix $S_i$, for example $S_1$ or $S_2$. In the exemplary 4×4 MIMO system, given the rearranged matrix, $S_{Rearranged}$, as in equation[10a], and submatrices $S_1$ and $S_2$, as in equations [10c] and [10d] respectively, Givens rotation matrices may be computed as illustrated in the following equations:

$$P_1 = \begin{bmatrix} \cos(\theta_1) & \sin(\theta_1) \\ -\sin(\theta_1) & \cos(\theta_1) \end{bmatrix} \quad \text{equation [17a]}$$

and:

$$P_2 = \begin{bmatrix} \cos(\theta_2) & \sin(\theta_2) \\ -\sin(\theta_2) & \cos(\theta_2) \end{bmatrix} \quad \text{equation [17b]}$$

Based on the Givens rotation matrices of equations [17a] and [17b], and the rearranged matrix of equation[10a], a matrix may be compute as illustrated in the following equation:

$$\begin{bmatrix} S_1 \cdot P_1 & 0_2 \\ 0_2 & S_2 \cdot P_2 \end{bmatrix}$$ equation [18]

The value $\theta_1$ may be selected in the following equation:

$$S_1 \cdot P_1 = \begin{bmatrix} \lambda_{11} \cdot \cos(\theta_1) & \lambda_{11} \cdot \sin(\theta_1) \\ -\lambda_{44} \cdot \sin(\theta_1) & \lambda_{44} \cdot \cos(\theta_1) \end{bmatrix}$$ equation [19a]

to maximize the minimum Euclidean distances for destination streams associated with the matrix $S_1$. The value $\theta_2$ may be selected in the following equation:

$$S_2 \cdot P_2 = \begin{bmatrix} \lambda_{22} \cdot \cos(\theta_2) & \lambda_{22} \cdot \sin(\theta_2) \\ -\lambda_{33} \cdot \sin(\theta_2) & \lambda_{33} \cdot \cos(\theta_2) \end{bmatrix}$$ equation [19b]

to maximize the minimum Euclidean distances for destination streams associated with the matrix $S_2$.

Figure 4A:
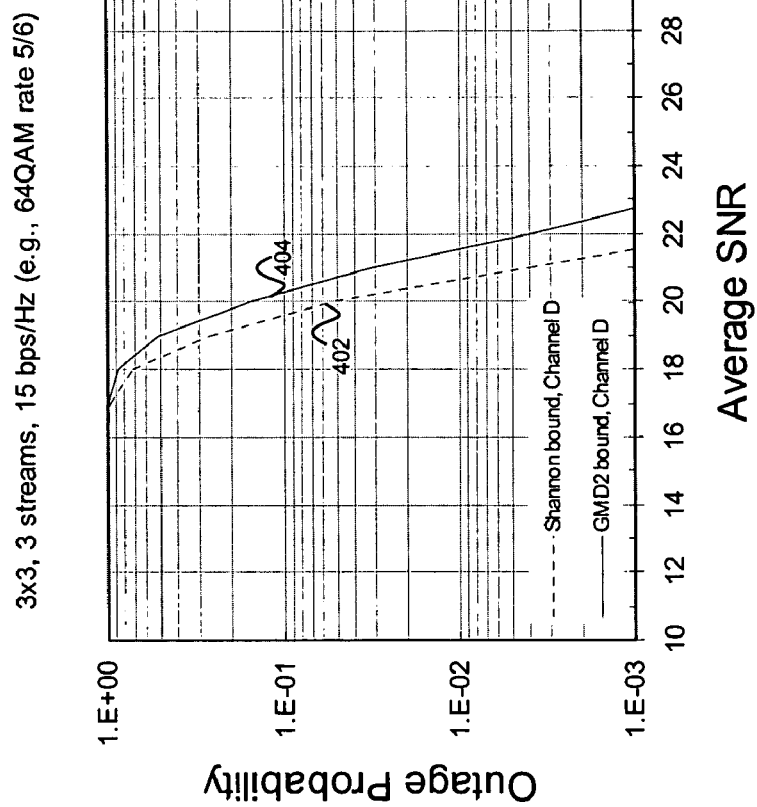
FIG. 4A is an exemplary graph illustrating outage probability performance for a 3×3 MIMO system, in accordance with an embodiment of the invention.

FIG. 4A is an exemplary graph illustrating outage probability performance for a 3×3 MIMO system, in accordance with an embodiment of the invention. FIG. 4A presents simulation results illustrating the performance of a MIMO system comprising a MIMO transmitter, which comprises 3 transmitting antennas, and a MIMO receiver, which comprises 3 receiving antennas. The 3×3 MIMO system utilizes 3 spatial streams, for which NSS=3. The target outage capacity is 15 bits/second/Hz (bps/Hz). The channel estimate matrix H may be computed based on a D-type channel as specified in IEEE 802.11 specifications. The MIMO transmitter and MIMO receiver may utilize a 64 level quadrature amplitude modulation (64-QAM) modulation type, with a coding rate R=⅚.

Referring to FIG. 4A, there is shown a graph computed based on a Shannon bound 402, and a graph computed based on subspace beamforming 404. Outage capacity may refer to a minimum data transfer rate via a wireless communication medium between the MIMO transmitter and the MIMO receiver such that a measure data transfer rate, which is below the outage capacity may be considered to constitute an outage event. The outage probability may refer to a probability that an outage event will occur at a corresponding average signal to noise ratio (SNR). In FIG. 4A, the average SNR may be measured in decibels (dB).

The Shannon bound graph 402 may represent a theoretical minimum bound probability for an outage event for a given average SNR under the conditions specified for the simulation illustrated in FIG. 4A. For example, for an average SNR value of 20 dB, the Shannon bound outage probability may be about 0.05, or 5%. Consequently, there may be about a 0.95, or 95% probability that an outage capacity of 15 bps/Hz may be supported.

The Shannon bound graph 402 may represent a true Shannon capacity, $C_{true}$, computed based on the following equation, for example:

$$C_{true} = \log_2\left[\det\left(I + \frac{1}{N_0} \cdot H^H \cdot H\right)\right]$$ equation [20]

where det(X) may represent the determinant of the matrix X, I may represent the identity matrix, and H may represent a channel matrix. The noise power received at each receiving antenna at the MIMO receiver may be about equal to $N_0$.

The true Shannon capacity may also be represented as in the following equation, for example:

$$C_{true} = \sum_{k=1}^{NSS} \log_2\left[1 + \frac{1}{N_0}\lambda_{kk}^2\right]$$ equation [21]

where $\lambda_{kk}$ may represent a singular value as in equation[3], and k may represent an index for a spatial stream. NSS may represent a number of spatial streams transmitted. For the Shannon bound graph 402, NSS=3.

For the 3×3 MIMO system, the subspace beamforming graph 404 may represent outage probabilities for a MIMO system in which beamforming factors utilized at the MIMO transmitter and/or MIMO receiver may be computed by subdividing a 3×3 lower triangular matrix L into a 2×2 lower triangular submatrix $L_1$, and a 1×1 submatrix $L_2$. The lower triangular submatrix $L_1$ may be associated with a group comprising spatial streams $ss_1$ and $ss_3$, while the submatrix $L_2$ may be associated with a group comprising spatial stream $ss_2$.

The outage capacity of 15 bps/Hz may be divided among the groups of spatial streams such that the group of spatial streams associated with the lower triangular submatrix $L_1$ may achieve an outage capacity of about 10 bps/Hz while the group of spatial streams associated with the lower triangular submatrix $L_2$ may achieve an outage capacity of about 5 bps/Hz, for example. The outage capacity, $C_i$, for spatial streams in the subspace associated with each submatrix, $L_i$, may be computed as in the following equation, for example:

$$C_i = \sum_{k=1}^{NSS_{Sub}[i]} \log_2\left[1 + \frac{1}{N_0}l_{kk}^2[i]\right]$$ equation [22]

where $l_{kk}[i]$ may represent a diagonal element in the submatrix $L_i$, and $NSS_{Sub}[i]$ may represent a number of spatial streams in the subspace associated with the matrix $L_i$.

For the subspace beamforming graph 404, $NSS_{Sub}[1]=2$, and $NSS_{Sub}[2]=1$. For the submatrix $L_1$, $l_{11}[1]$ may be about equal to $l_{22}[1]$, which may be about equal to $\sqrt{\lambda_{11} \cdot \lambda_{33}}$. For the submatrix $L_2$, $l_{11}[2]$ may be about equal to $\lambda_{22}$. An outage may occur when $C_1<10$ bps/Hz, and/or $C_2<5$ bps/Hz.

For the subspace beamforming graph 404, given an average SNR value of 20 dB, the outage probability may be about 0.15, or 15%. Consequently, there may be about a 0.85, or 85% probability that an outage capacity of 15 bps/Hz may be supported in various embodiments of the invention. To achieve the Shannon bound outage probability of 0.05, a 3×3 MIMO system utilizing subspace beamforming may require an average SNR value of less than 21 dB. This may represent an SNR gap of less than 1 dB for various embodiments of the invention when compared to the Shannon bound outage probability.

Figure 4B:
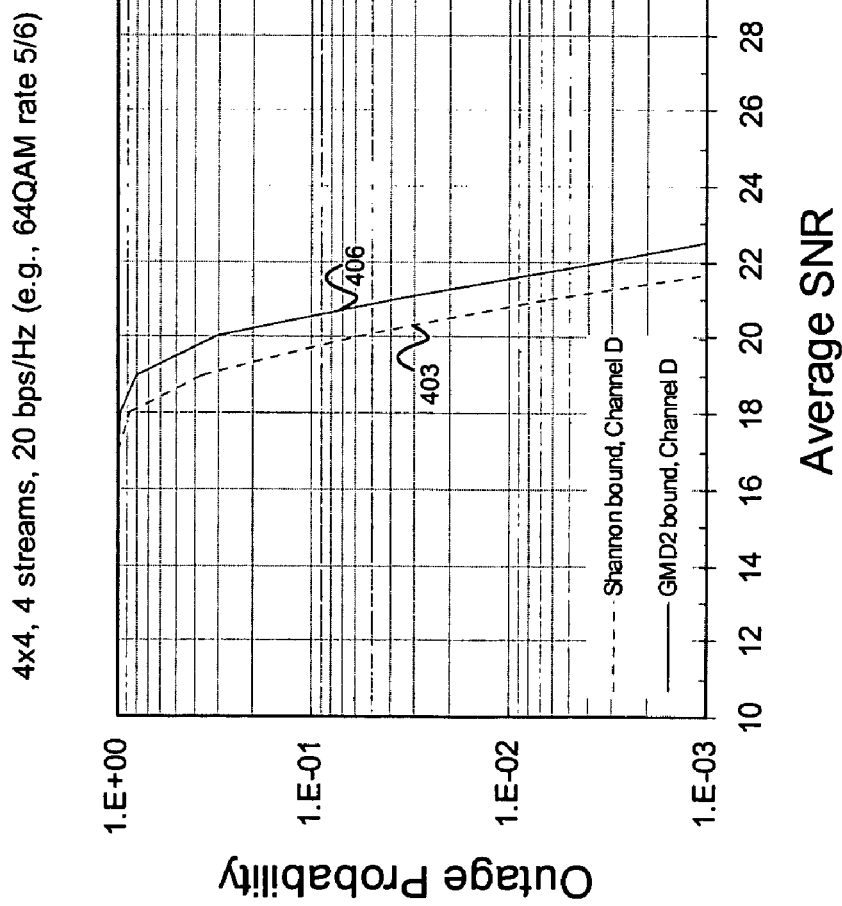
FIG. 4B is an exemplary graph illustrating outage probability performance for a 4×4 MIMO system, in accordance with an embodiment of the invention.

FIG. 4B is an exemplary graph illustrating outage probability performance for a 4×4 MIMO system, in accordance with an embodiment of the invention. FIG. 4B presents simulation results illustrating the performance of a MIMO system comprising a MIMO transmitter, which comprises 4 transmitting antennas, and a MIMO receiver, which comprises 4 receiving antennas. The 4×4 MIMO system utilizes 4 spatial streams, for which NSS=4. The target outage capacity is 20 bps/Hz. The channel estimate matrix H may be computed based on a D-type channel as specified in IEEE 802.11 specifications. The MIMO transmitter and MIMO receiver may utilize a 64 level quadrature amplitude modulation (64-QAM) modulation type, with a coding rate R=5/6.

Referring to FIG. 4B, there is shown a graph computed based on a Shannon bound 403, and a graph computed based on subspace beamforming 406. Outage capacity and outage probability may be substantially as described for FIG. 4A. The Shannon bound graph 403 may be computed substantially as described in equations [20] and [21]. For the Shannon bound graph 403, NSS=4. For example, for an average SNR value of 20 dB, the Shannon bound outage probability may be about 0.05, or 5%. Consequently, there may be about a 0.95, or 95% probability that an outage capacity of 20 bps/Hz may be supported.

For the 4×4 MIMO system, the subspace beamforming graph 406 may represent outage probabilities for a MIMO system in which beamforming factors utilized at the MIMO transmitter and/or MIMO receiver may be computed by subdividing a 4×4 lower triangular submatrix L into a 2×2 lower triangular submatrix $L_1$, and a 2×2 submatrix $L_2$. The lower triangular submatrix $L_1$ may be associated with a group comprising spatial streams $ss_1$ and $ss_4$, while the submatrix $L_2$ may be associated with a group comprising spatial streams $ss_2$ and $ss_3$. The outage capacity may be divided among the groups of spatial streams such that each group may achieve an outage capacity of 10 bps/Hz while still meeting the overall outage capacity target of 20 bps/Hz, for example. The outage capacity, $C_i$, for spatial streams in the subspace associated with each submatrix, $L_i$, may be computed as illustrated in equation [22], for example.

For the subspace beamforming graph 406, $NSS_{Sub}[1]=2$, and $NSS_{Sub}[2]=2$. For the submatrix $L_1$, $I_{11}[1]$ may be about equal to $I_{22}[1]$, which may be about equal to $\sqrt{\lambda_{11} \cdot \lambda_{44}}$. For the submatrix $L_2$, $I_{11}[2]$ may be about equal to $I_{22}[2]$, which may be about equal to $\sqrt{\lambda_{22} \cdot \lambda_{33}}$. An outage may occur when $C_1$<10 bps/Hz and/or $C_2$<10 bps/Hz.

For the subspace beamforming graph 406, given an average SNR value of 20 dB, the outage probability may be about 0.3, or 30%. Consequently, there may be about a 0.7, or 70% probability that an outage capacity of 20 bps/Hz may be supported in various embodiments of the invention. To achieve the Shannon bound outage probability of 0.05, a 4×4 MIMO system utilizing subspace beamforming may require an average SNR value of less than 21 dB. This may represent an SNR gap of less than 1 dB for various embodiments of the invention when compared to the Shannon bound outage probability.

Figure 5:
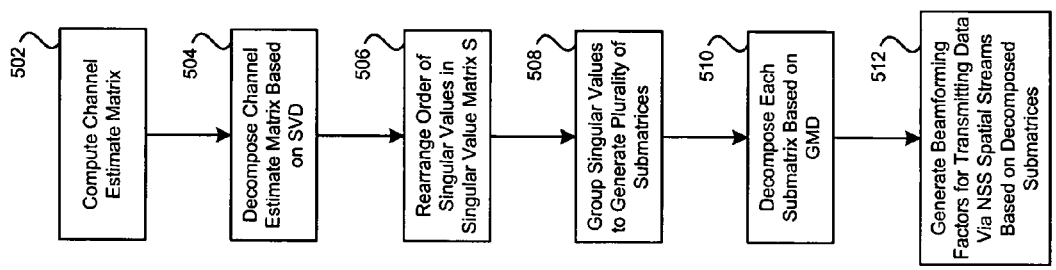
FIG. 5 is a flowchart illustrating exemplary steps for subspace GMD beamforming, in accordance with an embodiment of the invention.

FIG. 5 is a flowchart illustrating exemplary steps for subspace GMD beamforming, in accordance with an embodiment of the invention. Referring to FIG. 5, in step 502, a channel estimate matrix H may be computed at a MIMO transmitter 302. In step 504, the MIMO transmitter 302 may decompose the channel estimate matrix based on SVD. In step 506, the MIMO transmitter 302 may rearrange the order of singular values in a singular value matrix, S, computed based on SVD. In step 508, the MIMO transmitter 302 may group singular values from the matrix S to generate a plurality of submatrices. $S_i$. In step 510, the MIMO transmitter 302 may decompose each submatrix $S_i$ based on GMD. In step 512, the MIMO transmitter 302 may generate beamforming factors for transmitting data contained in a plurality of spatial streams $ss_i$ based on the set of decomposed submatrices $S_i$.

The beamforming factors $V_1 \cdot P$ may be computed based on $V_1$ in equation [2], P in equation [12e], and $P_1$ and $P_2$ in equation [12b].

Figure 6:
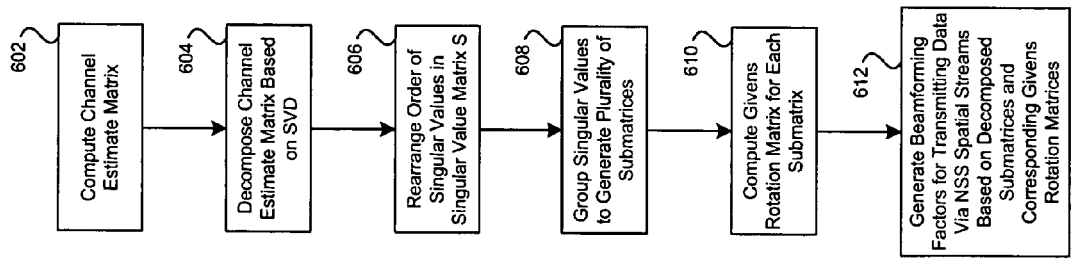
FIG. 6 is a flowchart illustrating exemplary steps for subspace beamforming for ML detection, in accordance with an embodiment of the invention.

FIG. 6 is a flowchart illustrating exemplary steps for subspace beamforming for ML detection, in accordance with an embodiment of the invention. Referring to FIG. 6, in step 602, a channel estimate matrix H may be computed at a MIMO transmitter 302. In step 604, the MIMO transmitter 302 may decompose the channel estimate matrix based on SVD. In step 606, the MIMO transmitter 302 may rearrange the order of singular values in a singular value matrix, S, computed based on SVD. In step 608, the MIMO transmitter 302 may group singular values from the matrix S to generate a plurality of submatrices $S_i$. In step 510, the MIMO transmitter 302 may compute a Givens rotation matrix, $P_i$, for each submatrix $S_i$. In step 612, the MIMO transmitter 302 may generate beamforming factors for transmitting data contained in a plurality of spatial streams $ss_i$ based on the set of decomposed submatrices and corresponding Givens rotation matrices. The beamforming factors $V_1 \cdot P$ may be computed based on $V_1$ in equation [2], P in equation [12e], $P_1$ in equation [17a], and $P_2$ in equation [17b].

In various embodiments of the invention, a channel estimate matrix, H, may be computed based on channel reciprocity, or based on feedback information. In a system based on channel reciprocity, the channel estimates for signals communicated from the MIMO transmitter 302 to the MIMO receiver 322 may be about equal to the channel estimates for signals communicated from the MIMO receiver 322 to the MIMO transmitter 302. In a system based on feedback information, the MIMO receiver 322 may compute channel estimates based on signals received from the MIMO transmitter 302, and communicate the computed channel estimates to the MIMO transmitter 302.

Aspects of the system may comprise a MIMO transmitter 302 that enables decomposition of a channel estimate matrix into a plurality of constituent matrices. The MIMO transmitter 302 may also enable generation of a plurality of submatrices from at least one of the plurality of constituent matrices. The MIMO transmitter 302 may subsequently enable transmission of data in a plurality of spatial streams based on decomposing each of the plurality of submatrices. At least one of the plurality of constituent matrices may be an M×N diagonal matrix. A value for a matrix element located in an $i^{th}$ row and $i^{th}$ column of the diagonal matrix may be greater than or equal to a value for a matrix element located in a $j^{th}$ row and $j^{th}$ column of the diagonal matrix, where i and j refer to matrix element indexes for which a value j is greater than a value i. Each of the plurality of submatrices may comprise a unique set of nonzero valued matrix elements from the diagonal matrix. Each of the plurality of submatrices is a diagonal matrix comprising no more than 2 rows and 2 columns. A $k^{th}$ one of the plurality of submatrices may comprise a $k^{th}$ largest valued nonzero matrix element in the diagonal matrix, and/or a $k^{th}$ smallest valued nonzero matrix element in the diagonal matrix, where k may represent a number.

The MIMO transmitter 302 may enable rearrangement of an order of nonzero valued diagonal elements in one of the plurality of constituent matrices to generate a rearranged matrix. Nonzero valued matrix elements from the rearranged matrix may be grouped to generate a plurality of submatrices. Each of the plurality of submatrices may be decomposed into a corresponding plurality of constituent submatrices. The MIMO transmitter 302 may enable grouping of the nonzero valued matrix elements in the rearranged matrix such that a value for a multiplicative product of nonzero matrix elements in a $p^{th}$ one of the plurality of submatrices, and/or a value for an arithmetic square of a nonzero matrix element, in the $p^{th}$ one of the plurality of submatrices is about equal to a value for a multiplicative product of nonzero matrix elements in a $q^{th}$ one of the plurality of submatrices, and/or to a value for an arithmetic square of a nonzero matrix element, in the $q^{th}$ one of the plurality of submatrices. At least one of the corresponding plurality of constituent matrices may be a lower triangular matrix, or an upper triangular matrix.

Another aspect of the system may comprise a MIMO transmitter 302 that enables decomposition of a channel estimate matrix into a plurality of constituent matrices. The MIMO receiver 322 may also enable generation of a plurality of submatrices from at least one of the plurality of constituent matrices. The MIMO receiver 322 may enable transmission of data contained in a plurality of spatial streams based on matrix multiplication of each of the plurality of submatrices by a corresponding Givens rotation matrix.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communication system, the method comprising:
   decomposing a channel estimate matrix into a plurality of constituent matrices at a multiple input multiple output (MIMO) transmitter;
   generating a plurality of submatrices from at least one of said plurality of constituent matrices; and
   transmitting data in a plurality of spatial streams based on decomposition of each of said plurality of submatrices.

2. The method according to claim 1, wherein said at least one of said plurality of constituent matrices is a diagonal matrix comprising M rows and N columns where M and N represent numbers.

3. The method according to claim 2, wherein a value for a matrix element located in an $i^{th}$ row and $i^{th}$ column of said diagonal matrix is greater than or equal to a value for a matrix element located in a $j^{th}$ row and $j^{th}$ column of said diagonal matrix wherein i and j refer to matrix element indexes for which a value j is greater than a value i.

4. The method according to claim 2, wherein said each of said plurality of submatrices comprises a unique set of nonzero valued matrix elements from said diagonal matrix.

5. The method according to claim 4, wherein said each of said plurality of submatrices is a diagonal matrix comprising no more than 2 rows and 2 columns.

6. The method according to claim 5, wherein a $k^{th}$ one of said plurality of submatrices comprises at least one of: a $k^{th}$ largest valued nonzero matrix element in said diagonal matrix, and a $k^{th}$ smallest valued nonzero matrix element in said diagonal matrix, where k represents a number.

7. The method according to claim 1, comprising rearranging an order of nonzero valued diagonal elements in one of said plurality of constituent matrices to generate a rearranged matrix.

8. The method according to claim 7, comprising grouping nonzero valued matrix elements from said rearranged matrix to generate a plurality of submatrices.

9. The method according to claim 8, comprising decomposing each of said plurality of submatrices into a corresponding plurality of constituent submatrices.

10. The method according to claim 7, comprising grouping said nonzero valued matrix elements in said rearranged matrix wherein one of: a value for a multiplicative product of nonzero matrix elements, and a value for an arithmetic square of a nonzero matrix element, in a $p^{th}$ one of said plurality of submatrices is about equal to one of: a value for a multiplicative product of nonzero matrix elements, and a value for an arithmetic square of a nonzero matrix element, in a $q^{th}$ one of said plurality of submatrices.

11. The method according to claim 9, wherein said at least one of said corresponding plurality of constituent matrices is one of: a lower triangular matrix, and an upper triangular matrix.

12. A system for processing signals in a communication system, the system comprising:
   circuitry that enables decomposition of a channel estimate matrix into a plurality of constituent matrices at a multiple input multiple output (MIMO) transmitter;
   said circuitry enables generation of a plurality of submatrices from at least one of said plurality of constituent matrices; and
   said circuitry enables transmission of data in a plurality of spatial streams based on decomposition of each of said plurality of submatrices.

13. The system according to claim 12, wherein said at least one of said plurality of constituent matrices is a diagonal matrix comprising M rows and N columns where M and N represent numbers.

14. The system according to claim 13, wherein a value for a matrix element located in an $i^{th}$ row and $i^{th}$ column of said diagonal matrix is greater than or equal to a value for a matrix element located in a $j^{th}$ row and $j^{th}$ column of said diagonal matrix wherein i and j refer to matrix element indexes for which a value j is greater than a value i.

15. The system according to claim 13, wherein said each of said plurality of submatrices comprises a unique set of nonzero valued matrix elements from said diagonal matrix.

16. The system according to claim 15, wherein said each of said plurality of submatrices is a diagonal matrix comprising no more than 2 rows and 2 columns.

17. The system according to claim 16, wherein a $k^{th}$ one of said plurality of submatrices comprises at least one of: a $k^{th}$ largest valued nonzero matrix element in said diagonal matrix, and a $k^{th}$ smallest valued nonzero matrix element in said diagonal matrix, where k represents a number.

18. The system according to claim 12, wherein said circuitry enables rearrangement of an order of nonzero valued diagonal elements in one of said plurality of constituent matrices to generate a rearranged matrix.

19. The system according to claim 18, wherein said circuitry enables grouping of nonzero valued matrix elements from said rearranged matrix to generate a plurality of submatrices.

20. The system according to claim 19, wherein said circuitry enables said decomposition of each of said plurality of submatrices into a corresponding plurality of constituent submatrices.

21. The system according to claim 18, wherein said circuitry enables grouping of said nonzero valued matrix elements in said rearranged matrix wherein one of: a value for a multiplicative product of nonzero matrix elements, and a value for an arithmetic square of a nonzero matrix element, in a $p^{th}$ one of said plurality of submatrices is about equal to one of: a value for a multiplicative product of nonzero matrix elements, and a value for an arithmetic square of a nonzero matrix element, in a $q^{th}$ one of said plurality of submatrices.

22. The system according to claim 20, wherein said at least one of said corresponding plurality of constituent matrices is one of: a lower triangular matrix, and an upper triangular matrix.

* * * * *